United States Patent
Lee et al.

(10) Patent No.: US 9,766,728 B2
(45) Date of Patent: Sep. 19, 2017

(54) METHOD FOR DETERMINING POSITION OF TOUCH EVENT ON TOUCH PANEL BY DYNAMICALLY ADJUSTING THRESHOLD AND RELATED COMPUTER READABLE MEDIUM

(71) Applicant: HIMAX TECHNOLOGIES LIMITED, Tainan (TW)

(72) Inventors: Chin-Lin Lee, Tainan (TW); Shen-Feng Tai, Tainan (TW); Jui-Min Liu, Tainan (TW); Cheng-Feng Hsieh, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 263 days.

(21) Appl. No.: 13/769,837

(22) Filed: Feb. 19, 2013

(65) Prior Publication Data
US 2014/0232660 A1    Aug. 21, 2014

(51) Int. Cl.
*G06F 3/041*    (2006.01)

(52) U.S. Cl.
CPC ............ *G06F 3/041* (2013.01); *G06F 3/0416* (2013.01)

(58) Field of Classification Search
CPC ...................................................... G06F 3/044
See application file for complete search history.

(56) References Cited

U.S. PATENT DOCUMENTS

| | | | |
|---|---|---|---|
| 8,274,485 B2 | 9/2012 | Liu | |
| 2006/0221061 A1* | 10/2006 | Fry | G06F 3/0418 345/173 |
| 2007/0008295 A1 | 1/2007 | Chien | |
| 2008/0150905 A1* | 6/2008 | Grivna et al. | 345/173 |
| 2008/0309629 A1* | 12/2008 | Westerman et al. | 345/173 |
| 2011/0181519 A1* | 7/2011 | Tsai et al. | 345/173 |
| 2011/0248948 A1* | 10/2011 | Griffin | G06F 3/041 345/174 |
| 2013/0106733 A1* | 5/2013 | Wang | G06F 3/0418 345/173 |

FOREIGN PATENT DOCUMENTS

| | | |
|---|---|---|
| TW | 201108063 | 3/2011 |
| TW | I342509 | 5/2011 |
| TW | I362607 | 4/2012 |
| TW | I376622 | 11/2012 |

* cited by examiner

*Primary Examiner* — Jonathan Blancha
(74) *Attorney, Agent, or Firm* — Winston Hsu (57) ABSTRACT

An exemplary method for determining a position of a touch event on a touch panel includes at least the following steps: scanning the touch panel by utilizing a first touch event detection threshold, and accordingly obtaining touch signal information corresponding to the touch event on the touch panel; determining if the touch panel is in a specific touch mode according to the touch signal information; and when it is determined that the touch panel is in the specific touch mode, setting a second touch event detection threshold that is different from the first touch event detection threshold, and scanning the touch panel by utilizing the second touch event detection threshold to obtain the position of the touch event.

17 Claims, 8 Drawing Sheets

Heavy touch

Heavy touch

METHOD FOR DETERMINING POSITION OF TOUCH EVENT ON TOUCH PANEL BY DYNAMICALLY ADJUSTING THRESHOLD AND RELATED COMPUTER READABLE MEDIUM

BACKGROUND OF THE INVENTION

1. Field of the Invention

The disclosed embodiments of the present invention relate to touch position determination, and more particularly, to a method for determining a position of a touch event on a touch panel in a specific touch mode (e.g. a heavy touch mode) by dynamically adjusting a threshold, and to a related computer readable medium.

2. Description of the Prior Art

When a touch panel is heavily pressed, the surface of the touch panel may be bent, and the performance (e.g. the linearity or the accuracy) of the touch panel may be affected. For example, a single-point touch event on the touch panel may be mistaken as a multi-point touch event. In another example, a single-point touch event may cause a touch sensing system to perform palm rejection, meaning the single-point touch event may be mistaken as an erroneous touch event. One conventional solution is to increase the gap between touch sensors and a liquid crystal module (LCM) or to increase the hardness of the touch sensors. These solutions, however, result in an increase in cost or an increased thickness of the touch panel.

Thus, there is a need for an innovative method which can determine a position of a touch event on a touch panel correctly even though the touch panel is heavily pressed.

SUMMARY OF THE INVENTION

In accordance with exemplary embodiments of the present invention, a method for determining a position of a touch event on a touch panel in a specific touch mode (e.g. a heavy touch mode) by dynamically adjusting a threshold and a related computer readable medium are proposed to solve the above-mentioned problem.

According to an embodiment of the present invention, an exemplary method for determining a position of a touch event on a touch panel is disclosed. The exemplary method includes the following steps: scanning the touch panel by utilizing a first touch event detection threshold, and accordingly obtaining touch signal information corresponding to the touch event on the touch panel; determining if the touch panel is in a specific touch mode according to the touch signal information; and when it is determined that the touch panel is in the specific touch mode, setting a second touch event detection threshold that is different from the first touch event detection threshold, and scanning the touch panel by utilizing the second touch event detection threshold to obtain the position of the touch event.

According to an embodiment of the present invention, an exemplary computer readable medium is disclosed. The exemplary computer readable medium has a program code stored therein. When executed by a processor, the program code causes the processor to execute the following steps: scanning the touch panel by utilizing a first touch event detection threshold, and accordingly obtaining touch signal information corresponding to the touch event on the touch panel; determining if the touch panel is in a specific touch mode according to the touch signal information; and when it is determined that the touch panel is in the specific touch mode, setting a second touch event detection threshold that is different from the first touch event detection threshold, and scanning the touch panel by utilizing the second touch event detection threshold to obtain the position of the touch event.

By adjusting a threshold dynamically according to an operation mode of a touch panel, the proposed method can improve the touch performance by improving the linearity and accuracy of the touch panel. In addition, the ghost point problem under a heavy pressure condition can be solved via software algorithms without increasing the hardware cost.

These and other objectives of the present invention will no doubt become obvious to those of ordinary skill in the art after reading the following detailed description of the preferred embodiment that is illustrated in the various figures and drawings.

DETAILED DESCRIPTION

The concept of the present invention is to adjust a threshold dynamically according to an operation mode (e.g. a heavy touch mode) of a touch panel, so that a position on the touch panel of a touch event can be determined correctly. The proposed method in the present invention may be applicable to a touch panel employing a self-sensing technique or a mutual-sensing technique. In addition, the proposed method may also be applicable to a multi-point touch application.

Figure 1:
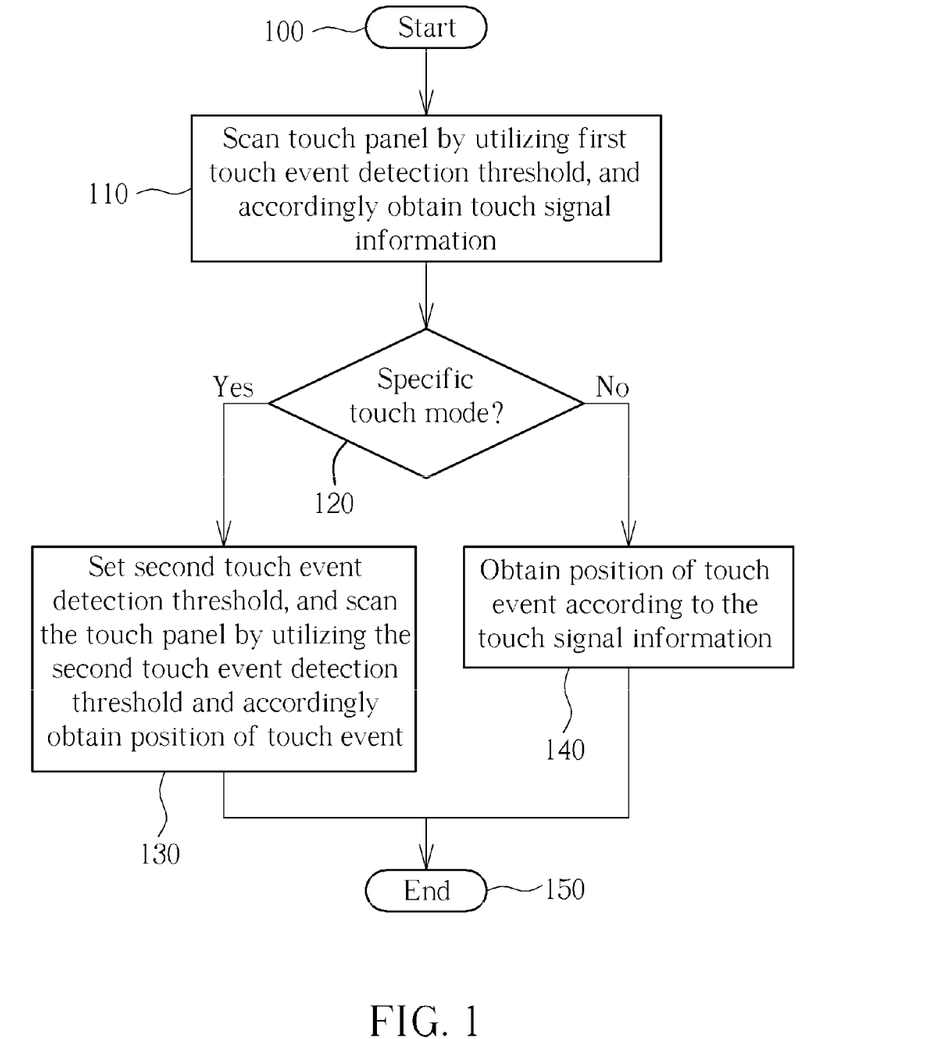
FIG. 1 is a flowchart illustrating an exemplary method for determining a position of a touch event on a touch panel according to an embodiment of the present invention.

Please refer to FIG. 1, which is a flowchart illustrating an exemplary method for determining a position of a touch event on a touch panel according to an embodiment of the present invention. The exemplary method may be briefly summarized as follows.

Step 100: Start.

Step 110: Scan the touch panel by utilizing a first touch event detection threshold, and accordingly obtain touch signal information corresponding to the touch event on the touch panel.

Step 120: Determine if the touch panel is in a specific touch mode according to the touch signal information. If yes, go to step 130; otherwise, go to step 140.

Step 130: Set a second touch event detection threshold that is different from the first touch event detection threshold, and scan the touch panel by utilizing the second touch event detection threshold and accordingly obtain the position of the touch event.

Step 140: Obtain the position of the touch event according to the touch signal information.

Step 150: End.

Provided that the result is substantially the same, the above steps are not required to be executed in the exact order shown in FIG. 1. In one implementation, other steps may be inserted between the above steps. For example, after the touch signal information is obtained in step 110, the flow may determine the occurrence of the touch event according to the touch signal information. Step 120 is executed when it is determined that the touch event does occur. In addition, when the proposed method is employed to determine the position on the touch panel when it is heavily touched, the specific touch mode may be a heavy touch mode. Moreover, in one implementation, the second touch event detection threshold in step 130 may be set higher than the first touch event detection threshold.

Figure 2:
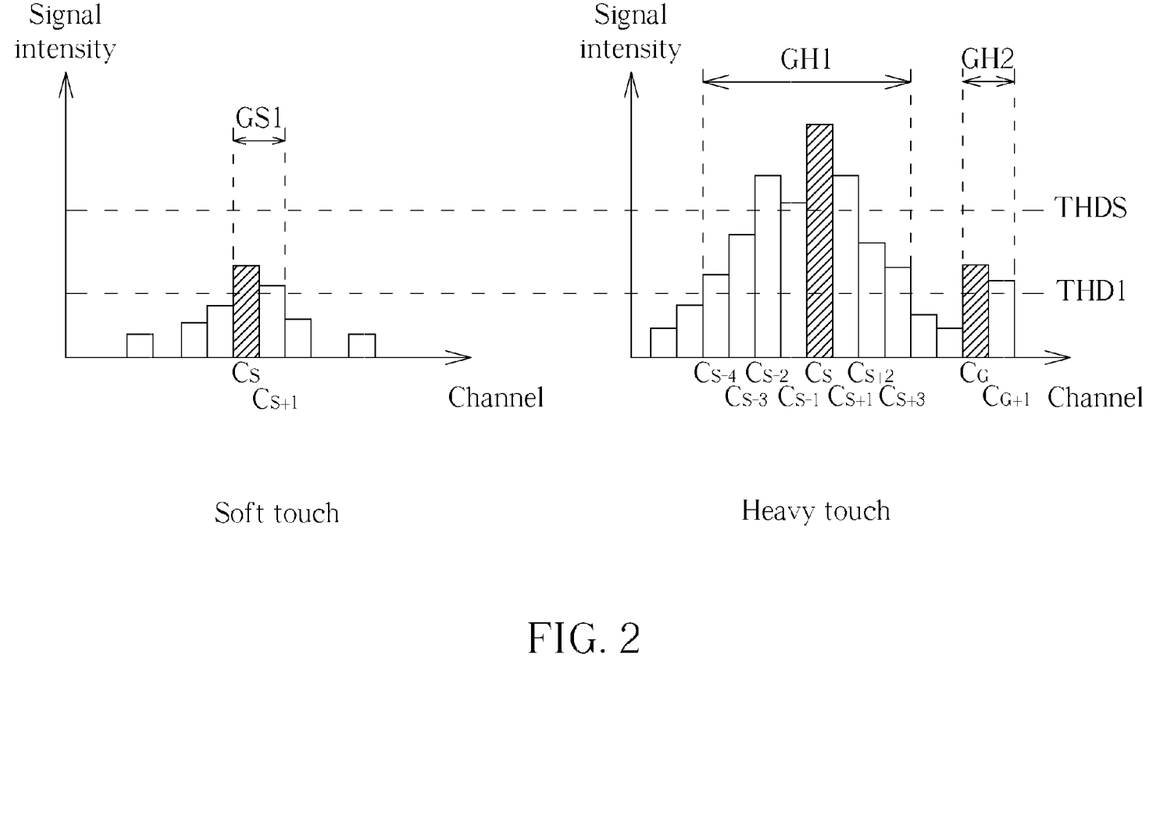
FIG. 2 is a diagram illustrating relationships between touch signal intensities and channels on a touch panel touched with different strengths according to an embodiment of the present invention.

Please refer to FIG. 2 in conjunction with FIG. 1 for a more detailed understanding of the proposed method. FIG. 2 is a diagram illustrating relationships between touch signal intensities and channels on a touch panel touched with different strengths according to an embodiment of the present invention. Due to different sensing techniques (e.g. a self-sensing technique or a mutual-sensing technique) employed by the touch panel, the channels may refer to traces or electrodes on the touch panel. As shown in the left portion of FIG. 2, the touch panel is softly touched at a specific position corresponding to channels $C_S$ and $C_{S+1}$. In the right portion of FIG. 2, the touch panel is touched at the same specific position (corresponding to the channels $C_S$ and $C_{S+1}$) but with a greater strength. Firstly, as described in step 110, the touch panel is scanned by utilizing a first touch event detection threshold THD1, and touch signal information corresponding to a touch event on the touch panel (i.e. the specific position being touched softly/heavily) is obtained accordingly. In this embodiment, the touch signal information may indicate touch signal intensities of channels on the touch panel.

As shown in the left portion of FIG. 2, when the touch panel is softly touched at the specific position, the channels $C_S$ and $C_{S+1}$ are found having touch signal intensities greater than the first touch event detection threshold THD1, wherein the channels $C_S$ and $C_{S+1}$ may be regarded as a signal group GS1. In the right portion of FIG. 2, when the touch panel is heavily touched at the specific position, channels $C_{S-4}$-$C_{S+3}$ and $C_G$-$C_{G+1}$ are found having touch signal intensities greater than the first touch event detection threshold THD1, wherein the adjacent channels $C_{S-4}$-$C_{S+3}$ and $C_G$-$C_{G+1}$ may be regarded as signal groups GH1 and GH2, respectively. When the touch signal information, as shown in the right portion of FIG. 2, is transmitted to the next stage for further processing, the touch event may be interpreted as multiple points on the touch panel are touched, resulting in determination errors.

In the embodiments shown in FIG. 2, in order to determine if the touch panel is in the specific touch mode (i.e. the heavy touch mode), a maximum intensity of the touch signal intensities of the channels may be compared with a specific mode detection threshold THDS different from the first touch event detection threshold THD1. In this embodiment, the specific mode detection threshold THDS is set higher than the first touch event detection threshold THD1, but this is not meant to be a limitation of the present invention. When the maximum intensity is higher than the specific mode detection threshold THDS, it is determined that the touch panel is in the specific touch mode (i.e. the heavy touch mode). In other words, the touch panel corresponding to the right portion of FIG. 2 is determined to be in the specific touch mode (i.e. the heavy touch mode), and then step 130 shown in FIG. 1 may be executed.

Figure 3:
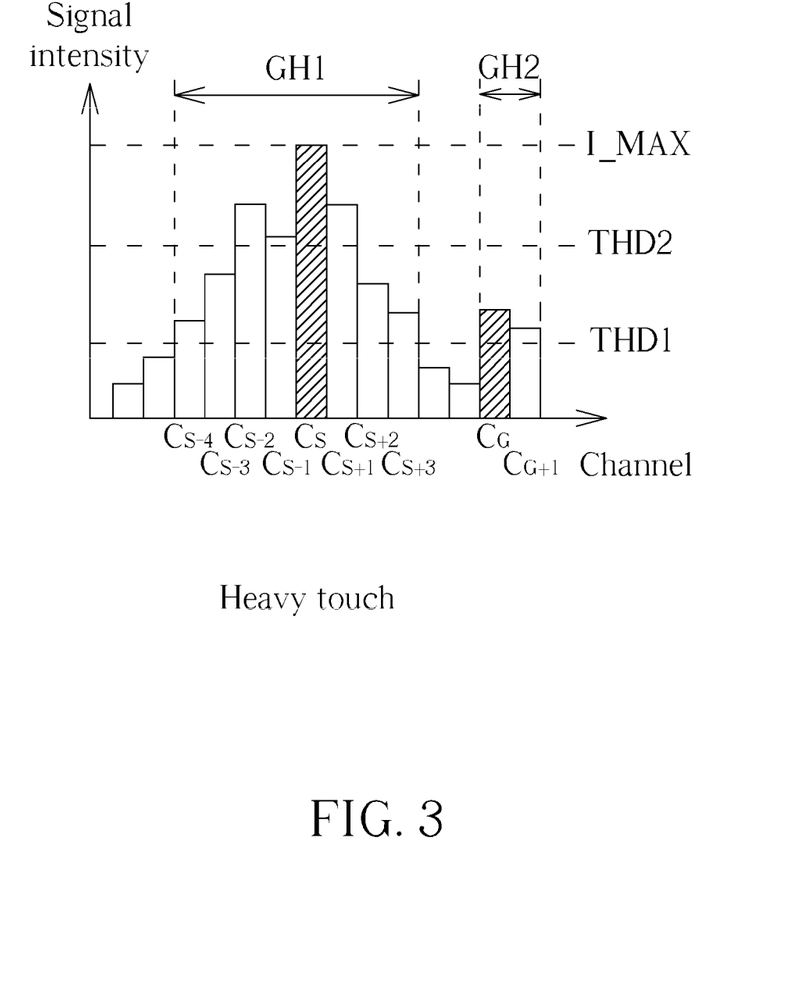
FIG. 3 is a diagram illustrating an exemplary configuration of a second touch event detection threshold of the touch panel in the specific touch mode according to an embodiment of the present invention.

Please refer to FIG. 3, which is a diagram illustrating an exemplary configuration of a second touch event detection threshold THD2 of the touch panel in the specific touch mode (i.e. the heavy touch mode shown in the right portion of FIG. 2) according to an embodiment of the present invention. In the embodiment, the second touch event detection threshold THD2 may be set according to a maximum intensity I_MAX of the touch signal intensities of the channels on the touch panel. In one implementation, the second touch event detection threshold THD2 is set to be equal to or higher than half the maximum intensity I_MAX. In another embodiment, the second touch event detection threshold THD2 may be set to be equal to the specific mode detection threshold THDS shown in FIG. 2. When it is determined that the touch panel is in the specific touch mode (e.g. the heavy touch mode) according to the specific mode detection threshold THDS, the touch position of the touch event may be obtained by directly scanning the touch panel with the specific mode detection threshold THDS. More particularly, the step of setting the second touch event detection threshold THD2 may be implemented by reusing the specific mode detection threshold THDS.

Figure 4:
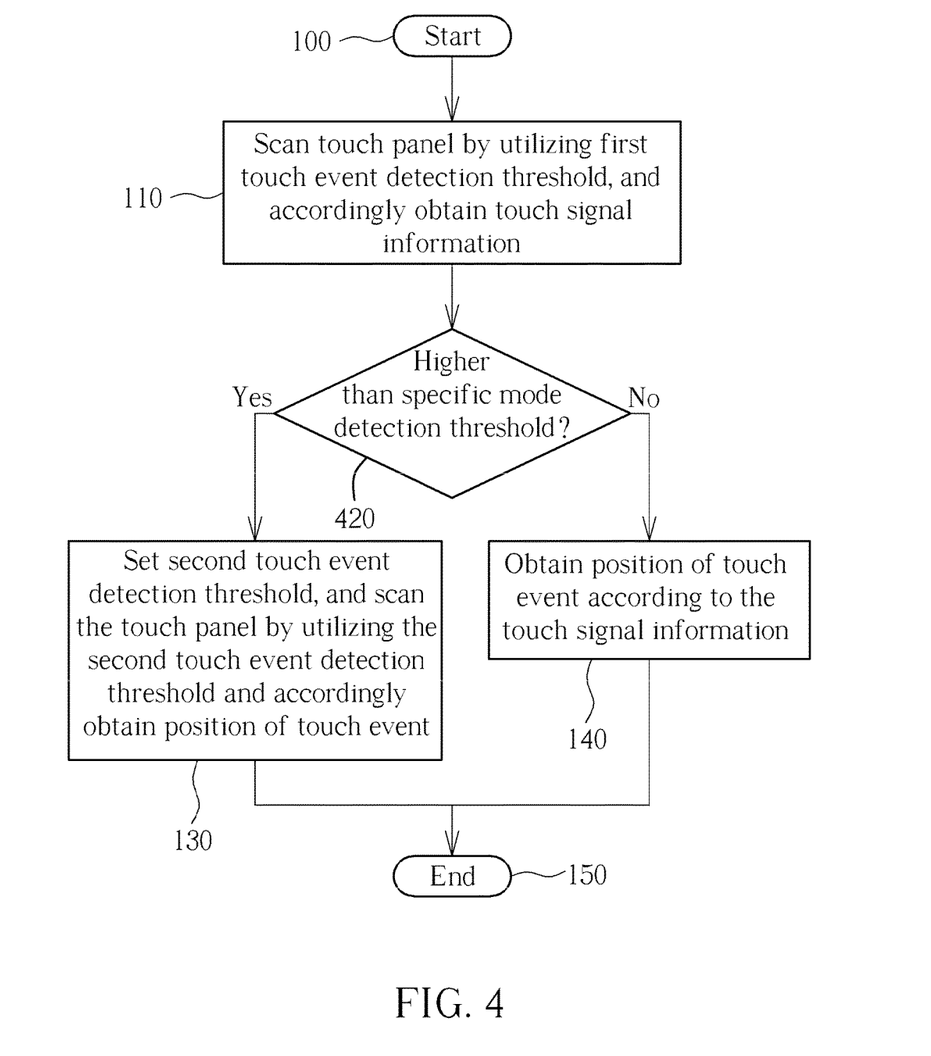
FIG. 4 is a flowchart illustrating an implementation of the exemplary method shown in FIG. 1.

Based on the aforementioned determination method, the exemplary method shown in FIG. 1 may be implemented by a flowchart shown in FIG. 4. The exemplary method shown in FIG. 4 may be briefly summarized as follows.

Step 100: Start.

Step 110: Scan the touch panel by utilizing a first touch event detection threshold, and accordingly obtain touch signal information corresponding to the touch event on the touch panel.

Step 420: Determine if the touch panel is in a specific touch mode by comparing a maximum intensity of the touch signal intensities of the channels with a specific mode detection threshold, wherein the specific mode detection threshold is different from the first touch event detection threshold. If the maximum intensity is higher than the specific mode detection threshold, go to step 130; otherwise, go to step 140.

Step 130: Set a second touch event detection threshold that is different from the first touch event detection threshold, and scan the touch panel by utilizing the second touch event detection threshold and accordingly obtain the position of the touch event.

Step 140: Obtain the touch position of the touch event according to the touch signal information.

Step 150: End.

Provided that the result is substantially the same, the above steps are not required to be executed in the exact order shown in FIG. 4. In one implementation, other steps may be inserted between the above steps. As a person skilled in the art can readily understand the operation of the method shown in FIG. 4 after reading the paragraphs directed to FIGS. 1-3, further description is omitted for brevity.

Figure 5:
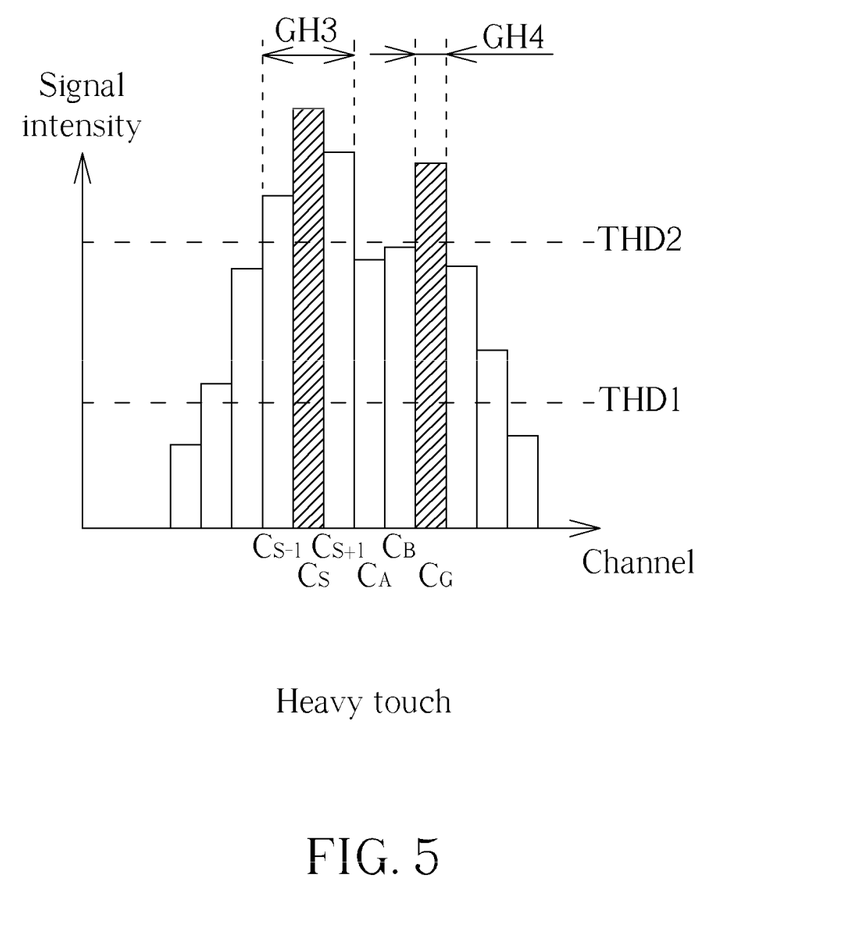
FIG. 5 is a diagram illustrating a relationship between touch signal intensities and channels on a touch panel being touched more heavily according to an embodiment of the present invention.
Figure 6:
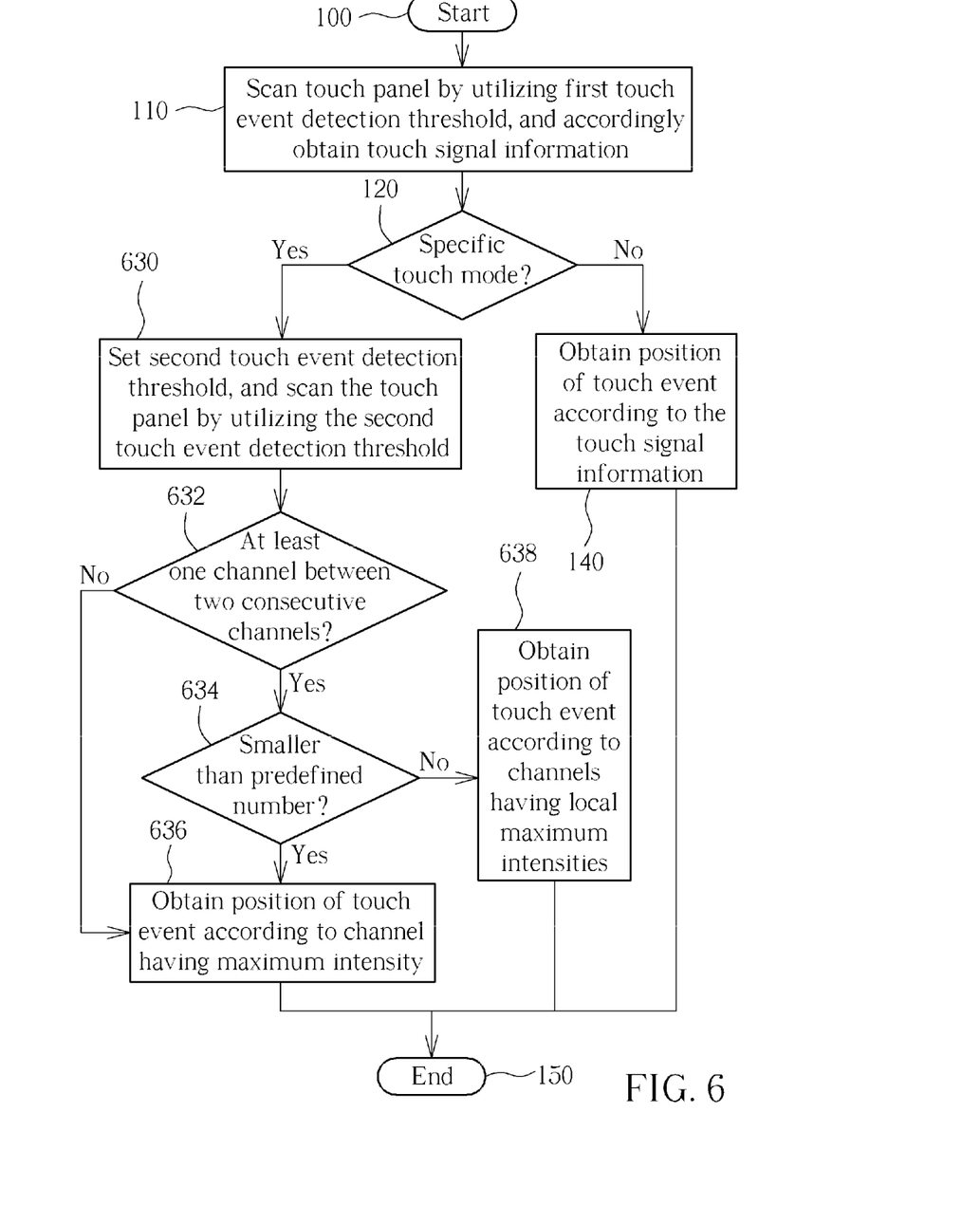
FIG. 6 is a flowchart illustrating an implementation of the exemplary method shown in FIG. 1.

In one embodiment, a determination criterion for object separation (e.g. finger-separation condition) may be relaxed to enhance the performance (e.g. the linearity or the accuracy) of the touch panel. Please refer to FIG. 5 and FIG. 6 together. FIG. 5 is a diagram illustrating a relationship between touch signal intensities and channels on a touch panel being touched more heavily (i.e. stronger than the condition shown in the right portion of FIG. 2) according to an embodiment of the present invention. FIG. 6 is a flowchart illustrating an implementation of the exemplary method shown in FIG. 1. As shown in FIG. 5, each of the channels $C_{S-1}$, $C_S$, $C_{S+1}$ and $C_G$ has a touch signal intensity greater than the second touch event detection threshold THD2, and there are still two signal groups GH3 and GH4 after a second touch event detection threshold THD2 is employed to scan the touch panel (step 630). Channels $C_A$ and $C_B$ (having touch signal intensities lower than the second touch detection threshold) are found to be located between two consecutive channels $C_{S+1}$ and $C_G$ (having touch signal intensities greater than the second touch event detection threshold) (step 632). Next, the number of channels each having a touch signal intensity lower than the second touch detection threshold may be compared with a predefined number (step 634). When the number of channels is smaller than a predetermined number, the touch position of the touch event may be obtained according to the channel $C_S$ having a maximum intensity of touch signal intensities (step 636). By way of example but not limitation, the touch position of the touch event may be obtained according to the signal group GH3 including the channel $C_S$ having the maximum intensity. As the predetermined number may be set according to a determination criterion for object separation (e.g. finger-separation condition), a ghost point (e.g. a touch position corresponding to the channel $C_G$) may be excluded when the determination criterion for the object separation is relaxed. For example, when the predetermined number is adjusted from two to three, the two signal groups GH3 and GH4 may be regarded as a single signal group, or the signal group GH4 may be neglected. Thus, a single touch position corresponding to the channels $C_S$ and $C_{S+1}$ can be obtained. In brief, the exemplary method shown in FIG. 6 may be summarized as follows.

Step 100: Start.

Step 110: Scan the touch panel by utilizing a first touch event detection threshold, and accordingly obtain touch signal information corresponding to the touch event on the touch panel.

Step 120: Determine if the touch panel is in a specific touch mode according to the touch signal information. If yes, go to step 630; otherwise, go to step 140.

Step 630: Set a second touch event detection threshold that is different from the first touch event detection threshold, and scan the touch panel by utilizing the second touch event detection threshold.

Step 632: Check if there is at least one channel having a touch signal intensity lower than the second touch detection threshold between two consecutive channels each having a touch signal intensity greater than the second touch event detection threshold. If yes, go to step 634; otherwise, go to step 636.

Step 634: Check if the number of the channel is smaller than a predefined number by comparing the number of the channel with the predefined number. If the number of the channel is smaller than the predefined number, go to step 636; otherwise, go to step 638.

Step 636: Obtain the position of the touch event according to a channel having a maximum intensity of the touch signal intensities.

Step 638: Obtain the position of the touch event according to channels having local maximum intensities of the touch signal intensities.

Step 140: Obtain the position of the touch event according to the touch signal information.

Step 150: End.

In step 636, the touch event may be a single-point touch event under the specific touch mode (e.g. the heavy touch mode). In step 638, the touch event may be a multi-point touch event under the specific touch mode (e.g. the heavy touch mode). Provided that the result is substantially the same, the above steps are not required to be executed in the exact order shown in FIG. 6. In one implementation, other steps may be inserted between the above steps. As a person skilled in the art can readily understand the operation of the method shown in FIG. 6 after reading the paragraphs directed to FIGS. 1-5, further description is omitted for brevity.

Figure 7:
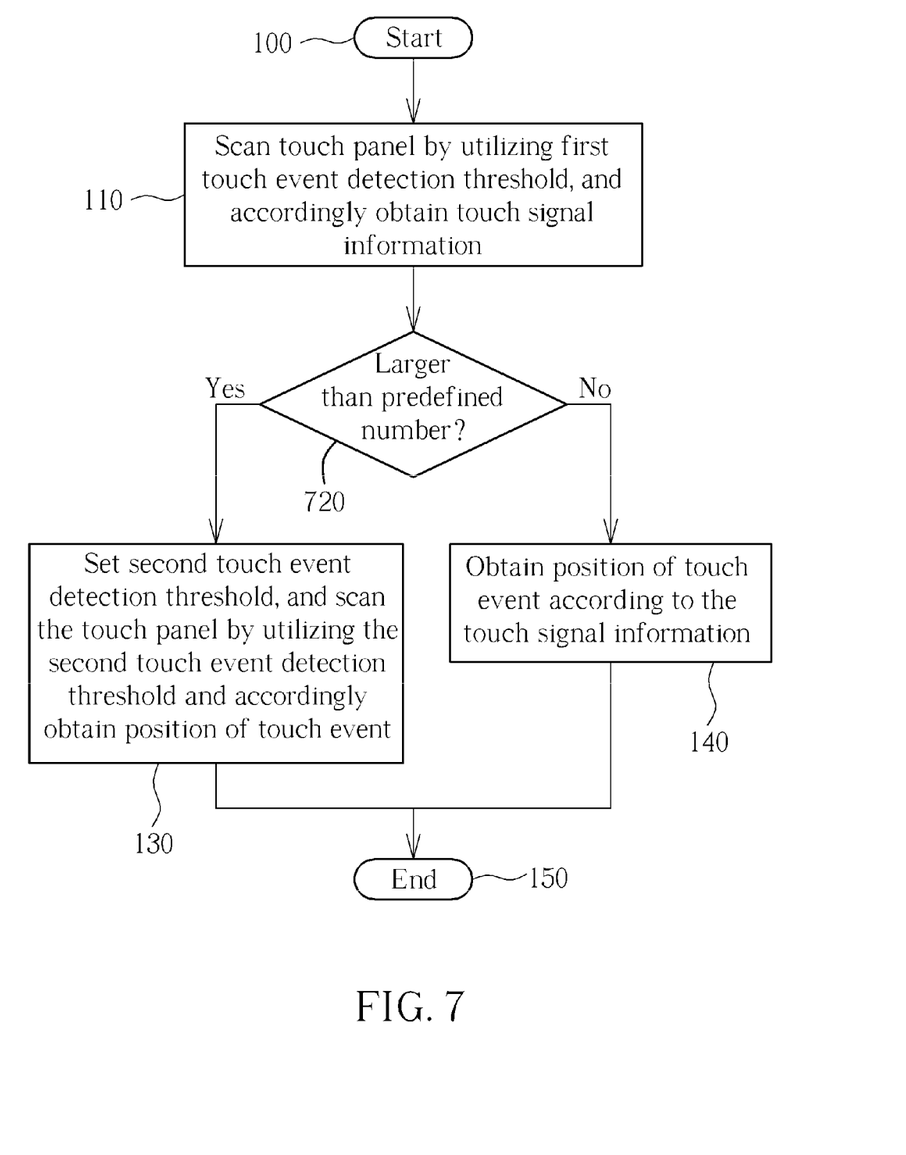
FIG. 7 is a flowchart illustrating an implementation of the exemplary method shown in FIG. 1.

In one embodiment, the touch signal information may indicate a number of channels each having a touch signal intensity greater than a first touch event detection threshold. Please refer to FIG. 2 again in conjunction with FIG. 7. FIG. 7 is a flowchart illustrating an implementation of the exemplary method shown in FIG. 1. As shown in FIG. 2, when the touch panel is softly touched at the specific position, the touch signal information indicates that there are two channels $C_S$ and $C_{S+1}$ having touch signal intensities greater than the first touch event detection threshold THD1. When the touch panel is heavily touched at the specific position, the touch signal information indicates that there are ten channels $C_{S-4}$-$C_{S+3}$ and $C_G$-$C_{G+1}$ having touch signal intensities greater than the first touch event detection threshold THD1. Therefore, the number of channels each having a touch signal intensity greater than the first touch event detection threshold THD1 may be different under different operation modes of the touch panel. In this embodiment, the number of channels (each having the touch signal intensity greater than the first touch event detection threshold THD1) may be compared with a predefined number, and when the number of channels each having the touch signal intensity greater than the first touch event detection threshold is larger than the predefined number, it is determined that the touch panel is in the specific touch mode (e.g. the heavy touch mode) in step 720. The exemplary method shown in FIG. 7 may be briefly summarized as follows.

Step 100: Start.

Step 110: Scan the touch panel by utilizing a first touch event detection threshold, and accordingly obtain touch signal information corresponding to the touch event on the touch panel.

Step 720: Determine if the touch panel is in a specific touch mode by comparing the number of channels each having the touch signal intensity greater than the first touch event detection threshold with the predefined number. If the number of channels each having the touch signal intensity greater than the first touch event detection threshold is larger than the predefined number, go to step 130; otherwise, go to step 140.

Step 130: Set a second touch event detection threshold that is different from the first touch event detection threshold, and scan the touch panel by utilizing the second touch event detection threshold and accordingly obtain the position of the touch event.

Step 140: Obtain the position of the touch event according to the touch signal information.

Step 150: End.

Provided that the result is substantially the same, the above steps are not required to be executed in the exact order shown in FIG. 7. In one implementation, other steps may be inserted between the above steps. As a person skilled in the art can readily understand the operation of the method shown in FIG. 7 after reading the paragraphs directed to FIGS. 1-5, further description is omitted for brevity.

Figure 8:
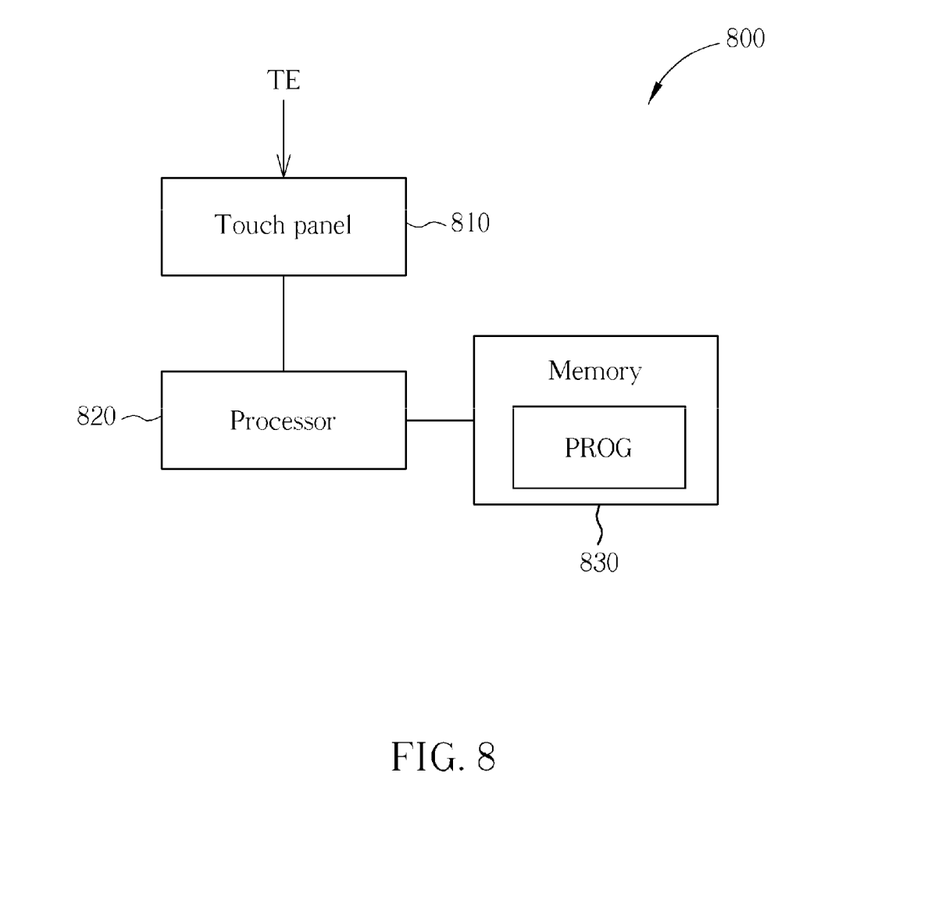
FIG. 8 is a block diagram illustrating an exemplary touch apparatus according to an embodiment of the present invention.

The steps shown in FIG. 1, FIG. 4, FIG. 6 and FIG. 7 may be implemented in various manners. For example, each step may be translated into a program code by commands, parameters, and variables of a specific program language. Please refer to FIG. 8, which is a block diagram illustrating an exemplary touch apparatus 800 according to an embodiment of the present invention. As shown in FIG. 8, a program code PROG is stored in a computer readable medium (e.g. a non-volatile memory) 830, and a processor (e.g. a micro control unit or a central processing unit) 820 is instructed to execute each step of the proposed method by fetching and executing the program code PROG. In brief, when executed by the processor 820, the program code PROG causes the processor 820 to execute at least the following steps: scanning a touch panel 810 by utilizing a first touch event detection threshold, and accordingly obtaining touch signal information corresponding to a touch event TE on the touch panel 810; determining if the touch panel 810 is in a specific touch mode according to the touch signal information; and when it is determined that the touch panel 810 is in the specific touch mode, setting a second touch event detection threshold that is different from the first touch event detection threshold, and scanning the touch panel 810 by utilizing the second touch event detection threshold to obtain the position of the touch event TE.

In summary, by dynamically adjusting a threshold according to an operation mode of a touch panel, the proposed method can improve the linearity and the accuracy of the touch panel to improve the overall touch performance. In addition, the ghost point problem under a heavy pressure condition can be solved by software algorithms without increasing the hardware cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a position of a touch event on a touch panel, comprising:
    utilizing a first touch event detection threshold as a reference threshold to scan the touch panel, and accordingly obtaining touch signal information corresponding to the touch event on the touch panel, wherein the reference threshold is a reference intensity of a touch signal triggered by the touch event on the touch panel, and the touch signal information indicates touch signal intensities of channels on the touch panel;
    determining if the touch panel is in a specific touch mode according to the touch signal information obtained using the first touch event detection threshold, wherein when it is determined that the touch panel is not in the specific touch mode, the position of the touch event is determined according to the touch signal information obtained using the first touch event detection threshold; and
    after it is determined that the touch panel is in the specific touch mode, referring to a maximum intensity of the touch signal intensities indicated by the touch signal information to determine a second touch event detection threshold, and dynamically adjusting the reference threshold from the first touch event detection threshold to the second touch event detection threshold according to the specific touch mode so as to dynamically adjust the reference intensity of the touch signal triggered by the touch event, and utilizing the second touch event detection threshold as the reference threshold to scan the touch panel to obtain the position of the touch event, wherein the second touch event detection threshold is different from the first touch event detection threshold.

2. The method of claim 1, wherein the step of determining if the touch panel is in the specific touch mode according to the touch signal information comprises:
    comparing the maximum intensity of the touch signal intensities of the channels with a specific mode detection threshold, wherein the specific mode detection threshold is different from the first touch event detection threshold; and
    when the maximum intensity is higher than the specific mode detection threshold, determining that the touch panel is in the specific touch mode.

3. The method of claim 2, wherein the specific mode detection threshold is higher than the first touch event detection threshold.

4. The method of claim 1, wherein the step of obtaining the position of the touch event comprises:
    checking if there is at least one channel having a touch signal intensity lower than the second touch event detection threshold between two consecutive channels each having a touch signal intensity greater than the second touch event detection threshold;
    when there is at least one channel having a touch signal intensity lower than the second touch event detection threshold between two consecutive channels each having a touch signal intensity greater than the second touch event detection threshold, comparing a number of the channel with a predefined number; and
    when the number of the channel is smaller than the predefined number, obtaining the position of the touch event according to a channel having a maximum intensity of the touch signal intensities.

5. The method of claim 1, wherein the second touch event detection threshold is equal to or higher than half the maximum intensity.

6. The method of claim 1, wherein the touch signal information indicates a number of channels each having a touch signal intensity greater than the first touch event detection threshold.

7. The method of claim 6, wherein the step of determining if the touch panel is in the specific touch mode according to the touch signal information comprises:
    comparing the number of channels each having the touch signal intensity greater than the first touch event detection threshold with a predefined number; and
    when the number of channels each having the touch signal intensity greater than the first touch event detection threshold is larger than the predefined number, determining that the touch panel is in the specific touch mode.

8. The method of claim 1, wherein the second touch event detection threshold is higher than the first touch event detection threshold.

9. The method of claim 1, wherein the specific touch mode is a heavy touch mode.

10. A non-transitory computer readable storage medium storing program code that is read from the non-transitory computer readable storage medium by a processor and is executed by the processor causing the processor to execute the following steps:

utilizing a first touch event detection threshold as a reference threshold to scan the touch panel, and accordingly obtaining touch signal information corresponding to the touch event on the touch panel, wherein the reference threshold is a reference intensity of a touch signal triggered by the touch event on the touch panel, and the touch signal information indicates touch signal intensities of channels on the touch panel;

determining if the touch panel is in a specific touch mode according to the touch signal information obtained using the first touch event detection threshold, wherein when it is determined that the touch panel is not in the specific touch mode, the position of the touch event is determined according to the touch signal information obtained using the first touch event detection threshold; and after it is determined that the touch panel is in the specific touch mode, referring to a maximum intensity of the touch signal intensities indicated by the touch signal information to determine a second touch event detection threshold, and dynamically adjusting the reference threshold from the first touch event detection threshold to a second touch event detection threshold according to the specific touch mode so as to dynamically adjust the reference intensity of the touch signal triggered by the touch event, and utilizing the second touch event detection threshold as the reference threshold to scan the touch panel to obtain a position of the touch event, wherein the second touch event detection threshold is different from the first touch event detection threshold.

11. The non-transitory computer readable storage medium of claim 10, wherein determining if the touch panel is in the specific touch mode according to the touch signal information comprises:

comparing the maximum intensity of the touch signal intensities of the channels with a specific mode detection threshold, wherein the specific mode detection threshold is different from the first touch event detection threshold; and when the maximum intensity is higher than the specific mode detection threshold, determining that the touch panel is in the specific touch mode.

12. The non-transitory computer readable storage medium of claim 10, wherein the specific mode detection threshold is higher than the first touch event detection threshold.

13. The non-transitory computer readable storage medium of claim 10, wherein obtaining the position of the touch event comprises:

checking if there is at least one channel having a touch signal intensity lower than the second touch event detection threshold between two consecutive channels each having a touch signal intensity greater than the second touch event detection threshold;

when there is at least one channel having a touch signal intensity lower than the second touch event detection threshold between two consecutive channels each having a touch signal intensity greater than the second touch event detection threshold, comparing a number of the channel with a predefined number; and when the number of the channel is smaller than the predefined number, obtaining the position of the touch event according to a channel having a maximum intensity of the touch signal intensities.

14. The non-transitory computer readable storage medium of claim 10, wherein the second touch event detection threshold is equal to or higher than half the maximum intensity.

15. The non-transitory computer readable storage medium of claim 10, wherein the touch signal information indicates a number of channels each having a touch signal intensity greater than the first touch event detection threshold.

16. The non-transitory computer readable storage medium of claim 15, wherein determining if the touch panel is in the specific touch mode according to the touch signal information comprises:

comparing the number of channels each having the touch signal intensity greater than the first touch event detection threshold with a predefined number; and when the number of channels each having the touch signal intensity greater than the first touch event detection threshold is larger than the predefined number, determining that the touch panel is in the specific touch mode.

17. The non-transitory computer readable storage medium of claim 10, wherein the second touch event detection threshold is higher than the first touch event detection threshold.

* * * * *